(12) United States Patent
Chang

(10) Patent No.: US 10,969,625 B2
(45) Date of Patent: Apr. 6, 2021

(54) LIQUID CRYSTAL DISPLAY DEVICE HAVING HIGH SCREEN RATIO

(71) Applicant: HON HAI PRECISION INDUSTRY CO., LTD., New Taipei (TW)

(72) Inventor: Kuo-Chou Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/687,987

(22) Filed: Nov. 19, 2019

(65) Prior Publication Data

US 2020/0174319 A1 Jun. 4, 2020

Related U.S. Application Data

(60) Provisional application No. 62/774,345, filed on Dec. 3, 2018.

(51) Int. Cl.
*G02F 1/13357* (2006.01)
*G02F 1/1335* (2006.01)

(52) U.S. Cl.
CPC .. *G02F 1/133606* (2013.01); *G02F 1/133514* (2013.01); *G02F 1/133528* (2013.01); *G02F 1/133605* (2013.01); *G02F 1/133608* (2013.01)

(58) Field of Classification Search
CPC ................................. G02F 1/133608
See application file for complete search history.

(56) References Cited

U.S. PATENT DOCUMENTS

| 2018/0117876 A1* | 5/2018 | Sohn | C09J 5/06 |
| 2019/0331960 A1* | 10/2019 | Li | G02F 1/13318 |
| 2020/0064681 A1* | 2/2020 | Son | H04M 1/03 |
| 2020/0117034 A1* | 4/2020 | Yin | G02F 1/1339 |

FOREIGN PATENT DOCUMENTS

CN 108897174 A 11/2018

\* cited by examiner

*Primary Examiner* — Edmond C Lau
(74) *Attorney, Agent, or Firm* — ScienBiziP, P.C.

(57) ABSTRACT

An LCD device with camera module includes a backlight module and an LCD panel. The LCD panel includes a color filter substrate, a thin film transistor (TFT) substrate, a liquid crystal layer between the color filter substrate and the TFT substrate, and a lower polarizer on a side of the TFT substrate away from the liquid crystal layer, the lower polarizer is adjacent to the backlight module. The backlight module defines a hole for the camera module. The hole extends through the lower polarizer. The hole includes a bottom wall and a sidewall coupling to the bottom wall. The bottom wall is defined and formed by the TFT substrate. An elastic element in a coupling region of the bottom wall and the sidewall blocks leakage of light from the backlight module.

8 Claims, 4 Drawing Sheets

LIQUID CRYSTAL DISPLAY DEVICE HAVING HIGH SCREEN RATIO

FIELD

The subject matter herein generally relates to a liquid crystal display (LCD) device, particularly relates to a full-screen LCD device having a high screen ratio.

BACKGROUND

A conventional LCD device generally includes an LCD panel and a backlight module. Taking mobile phones as an example, full-screen mobile phones having high screen ratio are popular. The high screen ratio requires increasing a screen ratio and reducing sizes of frames to give consumers better visual experience.

BRIEF DESCRIPTION OF THE DRAWINGS

Implementations of the present technology will now be described, by way of embodiments only, with reference to the attached figures.

DETAILED DESCRIPTION

Figure 1:
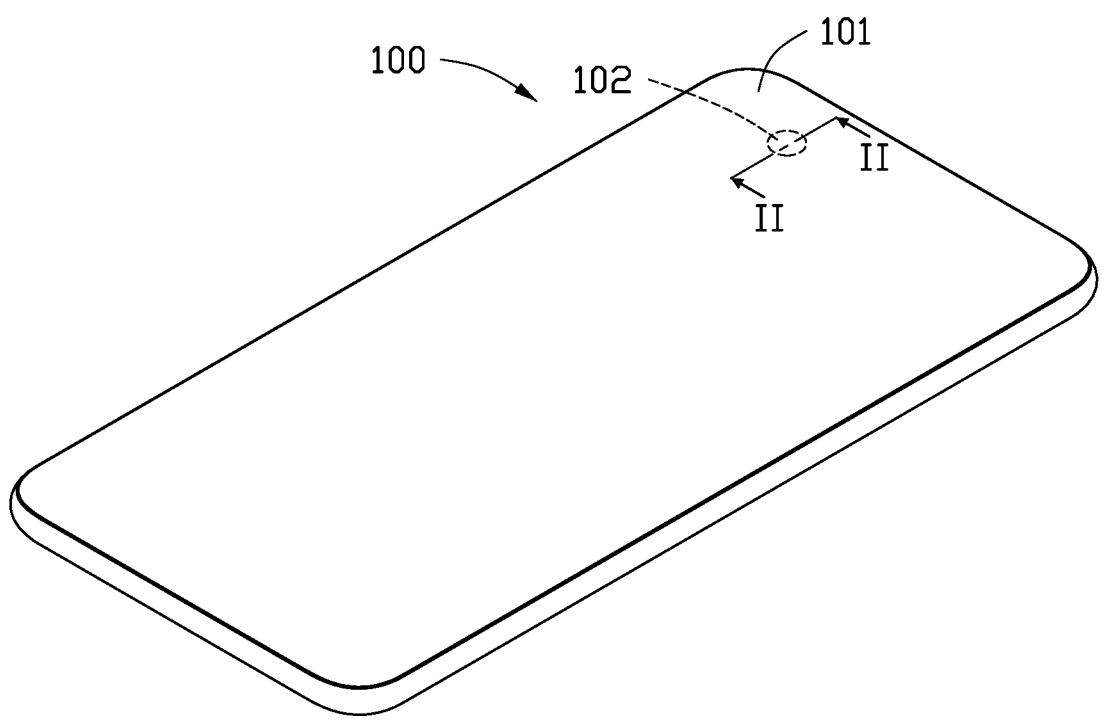
FIG. 1 is an isometric view of an LCD device in accordance with an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

FIG. 1 illustrates an LCD device 100 according to an embodiment. The LCD device 100 defines a display area 101. In this embodiment, the LCD device 100 is a full-screen mobile phone and an entire front surface of the LCD device 100 is the display area 101. A camera area 102 is positioned in the display area 101. The camera area 102 is a non-display area. In this embodiment, the camera area 102 is circular.

Figure 2:
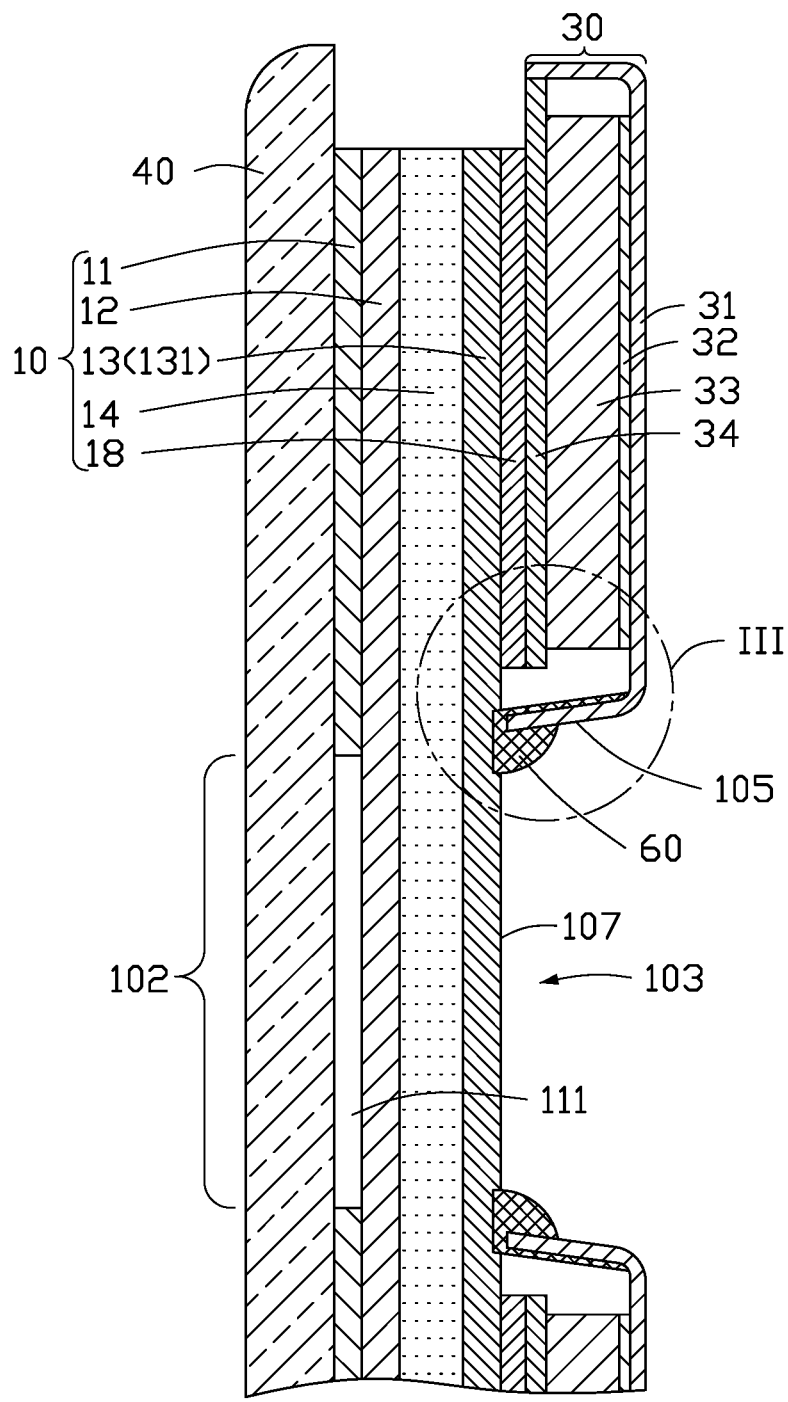
FIG. 2 is a cross-sectional view taken along line II-II of FIG. 1.

As shown in FIG. 2, the LCD device 100 includes a transparent cover 40, a LCD panel 10, and a backlight module 30. The LCD panel 10 is between the transparent cover 40 and the backlight module 30. A camera hole 103 is defined in the backlight module 30 and aligned with the camera area 102. A camera module (not shown) is positioned in the camera hole 103. A portion of the LCD panel 10 aligning with the camera area 102 allows light to pass through so as not to affect camera function of the camera module. For example, the portion of the LCD panel 10 aligning with the camera area 102 is transparent. A housing for accommodating the LCD panel 10 and the backlight module 30 in the LCD device 100 is not shown in FIG. 2.

The LCD panel 10 is a conventional LCD panel and includes a color filter substrate 12, a thin film transistor (TFT) substrate 13 opposite to the color filter substrate 12, and a liquid crystal layer 14 between the color filter substrate 12 and the TFT substrate 13. The LCD panel 10 further includes an upper polarizer 11 and a lower polarizer 18, wherein the upper polarizer 11 is laminated on a side of the color filter substrate 12 away from the liquid crystal layer 14; and the lower polarizer 18 is laminated on a side of the TFT substrate 13 away from the liquid crystal layer 14. The transparent cover 40 is adjacent to the upper polarizer 11, and the lower polarizer 18 is adjacent to the backlight module 30. The TFT substrate 13 includes a transparent substrate 131 and a plurality of conductive components (not shown) on the transparent substrate 131. The conductive components may be TFTs, data lines, scanning lines, and the like. The color filter substrate 12 (or referred to counter substrate) includes a transparent substrate (not shown) and a color filter layer (not shown) on the transparent substrate.

In order not to affect the camera function of the camera module, a portion of the color filter substrate 12 aligning with the camera area 102 and a portion of the TFT substrate 13 aligning with the camera area 102 are transparent. Since both the upper polarizer 11 and the lower polarizer 18 are opaque, the upper polarizer 11 defines a through hole 111 extending through the upper polarizer 11, and the camera hole 103 also extends through the lower polarizer 18, as shown in FIG. 2. The through hole 111 is aligned with the camera area 102. That is, the hole in the lower polarizer 18 and the hole in the backlight module 30 are aligned with each other and form the camera holes 103.

As shown in FIG. 2, the backlight module 30 is a side-type backlight module conventionally used in the art and includes a back plate 31 to carry optical components of the backlight module 30. The optical components include a reflection sheet 32 stacked on the back plate 31, a light guide plate 33 stacked on the reflection sheet 32, an optical film group 34 stacked on the light guide plate 33, wherein the optical film group 34 is relatively adjacent to the LCD panel 10. Specifically, the optical film group 34 of the backlight module 30 is coupled to the lower polarizer 18 of the LCD panel 10. The backlight module 30 further includes a light source (not shown) positioned on a side of the light guide plate 33. The optical film group 34 includes a diffusion sheet (not shown), and a brightness enhancement film (not shown).

As shown in FIG. 2, each of the reflection sheet 32, the light guide plate 33, and the optical film group 34 is substantially a flat plate. The camera hole 103 extends through the reflection sheet 32, the light guide plate 33, and the optical film group 34. A main structure of the back plate 31 is a flat plate on a side of the reflection sheet 32 away from the LCD panel 10, and the back plate 31 bends at a position of the camera area 102 to extend toward the LCD panel 10 until reaching the transparent substrate 131 of TFT substrate 13 such that a portion of the back plate 31 defines and forms a sidewall 105 of the camera hole 103. A portion of the transparent substrate 131 aligning with the camera area 102 defines a bottom wall 107 of the camera hole 103.

Figure 3:
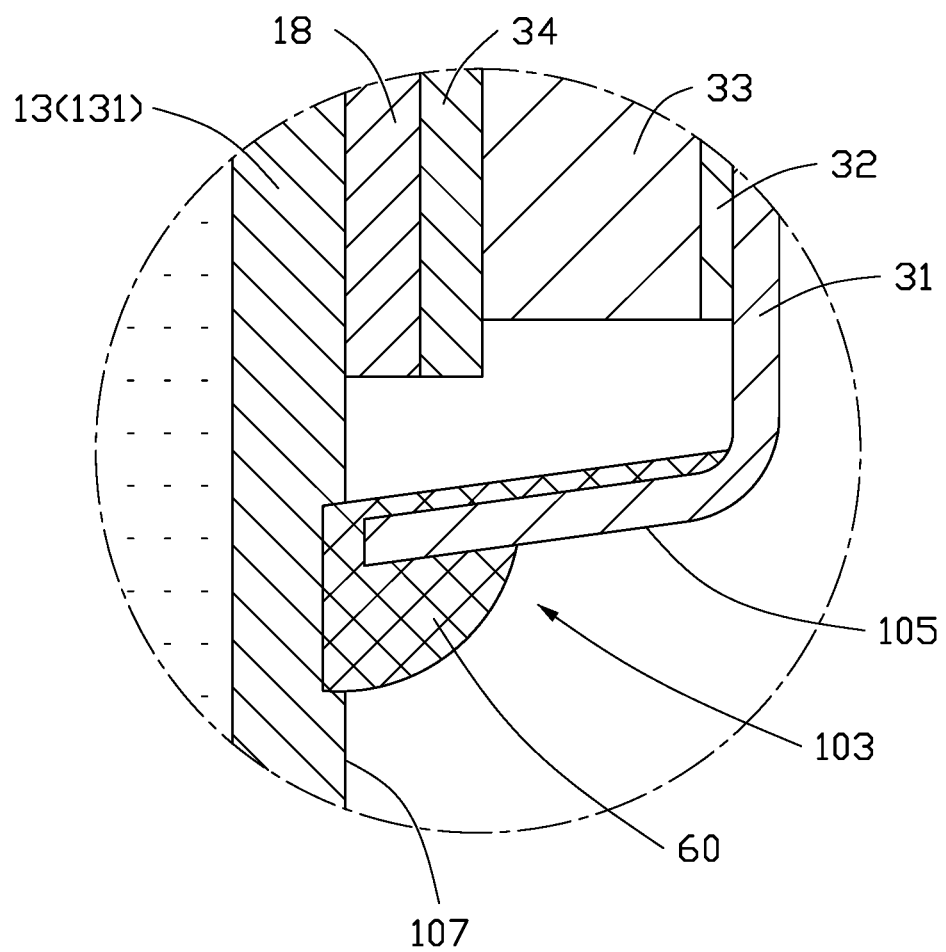
FIG. 3 is an enlarged view showing a portion III of FIG. 2.

As shown in FIG. 2 and FIG. 3, in this embodiment, the back plate 31 is not in direct contact with the transparent substrate 131 of the TFT substrate 13. An end of the back plate 31 adjacent to the transparent substrate 131 is spaced from the transparent substrate 131. It can be understood that in other embodiments, an end of the back plate 31 adjacent to the transparent substrate 131 is in direct contact with the transparent substrate 131.

Since the camera hole 103 is positioned in the display area 101, and assembly may slightly mismatch the backlight module 30 and the LCD panel 10 together, light from the backlight module 30 is easily leaked from a coupling position of the backlight module 30 and the LCD panel 10 to the outside. For example, light from the backlight module 30 can pass through a gap between the back plate 31 and the transparent substrate 131 and leak through the transparent substrate 131 or directly leak through the transparent substrate 131 (light leakage on the front side); light may also leak through a gap between the back plate 31 and the transparent substrate 131 toward the backlight module 30 (light leakage on the back side). A coupling region of the back plate 31 and the transparent substrate 131 is therefore provided with an elastic element 60. That is, a coupling region of the sidewall 105 and the bottom wall 107 of the camera hole 103 is provided with an elastic element 60. The elastic element 60 partially covers the transparent substrate 131 and the back plate 31.

Figure 4:
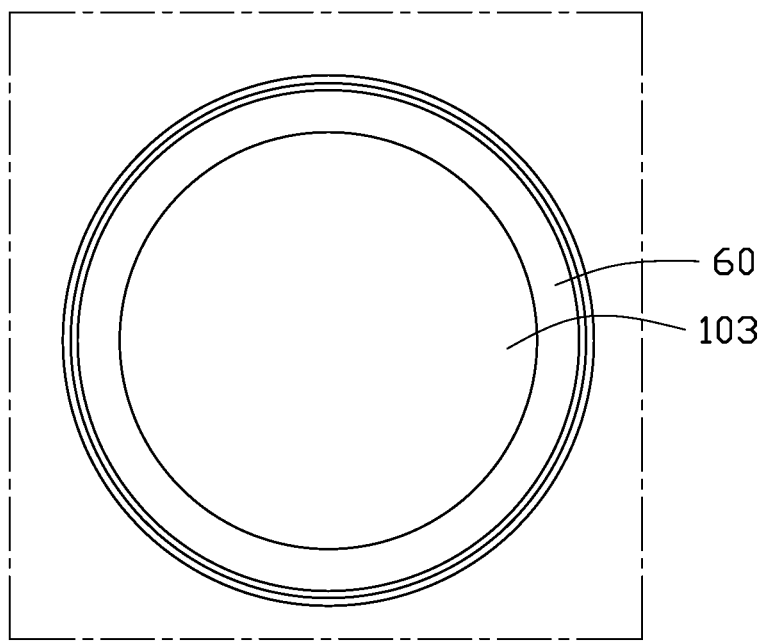
FIG. 4 is a bottom view of a part of the LCD device of FIG. 1.

As shown in FIG. 4, the elastic element 60 is in shape of a ring and extends along a peripheral portion of the bottom wall 107 of the camera hole 103, thereby blocking leakage of light. The elastic element 60 has a black or other opaque color having a light-blocking ability.

The elastic element 60 is soft and elastic. When the LCD panel 10 is assembled with the backlight module 30, elastic compressing of the elastic element 60 partially interferes with the transparent substrate 131 of the TFT substrate 13, thereby the coupling of the LCD panel 10 to the backlight module 30 is a tight fit, this prevents light leakage. The elastic element 60 can fill the gap between the back plate 31 and the transparent substrate 131 while making the bonding of the back plate 31 and the transparent substrate 131 more stable. The elastic element 60 may be made of black silicon rubber.

In this embodiment, the back plate 31 is made of a metal or an alloy. As shown in FIG. 3, the elastic element 60 also extends to a surface of the back plate 31 opposite to the sidewall 105, which prevents reflection of light incident on the backing plate 31.

The elastic element 60 and the back plate 31 may be integrally formed by in-mold molding. Alternatively, the elastic element 60 is sleeved on the back plate 31 as a separate component.

When assembling the LCD device 100, the LCD panel 10 and the backlight module 30 are separately assembled in advance, and after the elastic element 60 is formed on the back plate 31 of the backlight module 30, the LCD panel 10 and the backlight module 30 are assembled and bonded together, thereby preventing light leakage caused by tolerance in assembly of the backlight module 30 and the LCD panel 10.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. A liquid crystal display (LCD) device comprising:
 a backlight module for providing light;
 an LCD panel stacked on the backlight module, the LCD panel comprising a color filter substrate, a thin film transistor (TFT) substrate opposite to the color filter substrate, a liquid crystal layer between the color filter substrate and the TFT substrate, and a lower polarizer on a side of the TFT substrate away from the liquid crystal layer, the lower polarizer being adjacent to the backlight module;
 the backlight module defining a camera hole, the camera hole extending through the lower polarizer;
 wherein the camera hole comprises a bottom wall and a sidewall coupling to the bottom wall; the bottom wall is defined and formed by the TFT substrate; an elastic element is formed in a coupling region of the bottom wall and the sidewall to block light from the backlight module to leak;
 wherein the backlight module comprises a back plate; the back plate is substantially flat and bends at a position of the camera hole to extend toward the LCD panel, and the back plate defines and forms the sidewall;
 the elastic element covers a surface of the back plate opposite to the sidewall.

2. The LCD device of claim 1, wherein a portion of the color filter substrate aligning with the camera hole is transparent; a portion of the TFT substrate aligning with the camera hole is transparent.

3. The LCD device of claim 1, wherein the LCD panel further comprises an upper polarizer on a side of the color filter substrate away from the liquid crystal layer, the upper polarizer defines a through hole extending through the upper polarizer and aligning with the camera hole.

4. The LCD device of claim 1, wherein the elastic element extends along a circumference of the bottom wall to form a ring shape; the elastic element partially covers the TFT substrate and the back plate.

5. The LCD device of claim 1, wherein the backlight module further comprises a reflection sheet stacked on the back plate, a light guide plate stacked on the reflection sheet, and an optical film group stacked on the light guide plate, wherein the optical film group is adjacent to the LCD panel; the back plate is on a side of the reflection sheet away from the LCD panel; the camera hole extends through the reflection sheet, the light guide plate, and the optical film group.

6. The LCD device of claim 1, wherein the back plate is made of a metal or an alloy.

7. The LCD device of claim 1, wherein the back plate is not in direct contact with the TFT substrate; the elastic element fills between the back plate and the TFT substrate.

8. The LCD device of claim 1, wherein the elastic element is made of black silicon rubber.

* * * * *